United States Patent [19]

Brinkmann et al.

[11] 3,992,360

[45] Nov. 16, 1976

[54] TRANSPARENT POLYAMIDES FROM 1,3-BIS-(AMINOMETHYL)-CYCLOHEXANE AND ALIPHATIC AMINO CARBOXYLIC ACID

[75] Inventors: Ludwig Brinkmann, Frankfurt am Main; Walter Herwig, Neuenhain, Taunus, both of Germany

[73] Assignee: Hoechst Aktiengesellschaft, Frankfurt am Main, Germany

[22] Filed: Dec. 27, 1973

[21] Appl. No.: 428,819

[30] Foreign Application Priority Data

Dec. 29, 1972 Germany............................ 2263929

[52] U.S. Cl. .......................... 260/78 A; 260/33.4 R; 260/47 CZ; 260/78 L
[51] Int. Cl.² ............................................ C08G 69/08
[58] Field of Search ............... 260/78 L, 78 A, 78 R

[56] References Cited

UNITED STATES PATENTS

| | | | |
|---|---|---|---|
| 2,985,626 | 5/1961 | Caldwell et al. | 260/78 L |
| 2,985,628 | 5/1961 | Caldwell et al. | 260/78 L |
| 3,012,994 | 12/1961 | Bell et al. | 260/78 L |
| 3,875,129 | 4/1975 | Herwig et al. | 260/78 A |

*Primary Examiner*—Harold D. Anderson
*Attorney, Agent, or Firm*—Curtis, Morris & Safford

[57] ABSTRACT

There is disclosed a process for the preparation of novel transparent polyamides with improved properties. These polyamides are obtained by polycondensing 1,3-bis-(amino-methyl)-cyclohexane, which can be partly substituted by the 1,4-derivative, at least one aromatic dicarboxylic acid and at least one aminocarboxylic acid or the lactam thereof with at least one aliphatic straight chain or branched diamine or/and at least one aliphatic straight chain or branched dicarboxylic acid.

17 Claims, No Drawings

TRANSPARENT POLYAMIDES FROM 1,3-BIS-(AMINOMETHYL)-CYCLOHEXANE AND ALIPHATIC AMINO CARBOXYLIC ACID

The present invention concerns transparent polyamides.

Polyamides prepared from aliphatic diamines and aliphatic dicarboxylic acids have been known for decades. According to their composition, these polyamides are either crystalline substances having a high melting point, or amorphous substances having a relatively low second order transition temperature. The crystalline aliphatic polyamides are used for the preparation of fibres and injection moulded articles. The amorphous aliphatic polyamides are used in injection moulding. The second order transition temperatures of these amorphous polyamides are too low for use in many fields of application.

In the German Auslegeschrift No. 1,234,354 and in the German Offenlegungsschrift No. 1,495,556, which both correspond to U.K. specification No. 922,677 and U.S. Pat. No. 3,012,994, a number of polyamides was described which contain 1,3-bis-(aminomethyl)-cyclohexane and 1,4-bis-(aminomethyl)-cyclohexane as diamine components. The polyamides described are generally high-melting and opaque and are especially suitable for the preparation of fibres and sheets, but are little suited to the preparation of amorphous, transparent shaped articles.

The present invention provides a process for the preparation of transparent polyamides by polycondensation of diamines and dicarboxylic acids or their amide-forming derivatives, such as acid halides, esters, nitriles or amides in known manner and under the usual conditions, optionally in two or more process steps wherein a mixture of a. 50 to 100 mol %, preferably 65 to 100 mol %, 1,3-bis-(aminomethyl)-cyclohexane and 50 to 0 mol %, preferably 35 to 0 mol %, 1,4 bis-(aminomethyl)-cyclohexane, calculated on the sum of the bis-(aminomethyl)-cyclohexane components, b. at least one aromatic dicarboxylic acid containing from 6 to 20 carbon atoms, preferably from 8 to 14 carbon atoms, especially a mononuclear dicarboxylic acid carrying the carboxylic groups in the meta- or para-position, c. at least one aliphatic amino-carboxylic acid having from 2 to 20 carbon atoms, preferably from 6 to 12 carbon atoms, especially ω-amino carboxylic acid, or at least one corresponding lactam, and d. at least one straight chain or branched aliphatic diamine containing 2 to 20 carbon atoms, preferably 6 to 12 carbon atoms, or/and e. at least one saturated straight-chain or branched aliphatic dicarboxylic acid containing from 2 to 20 carbon atoms, preferably from 6 to 12 carbon atoms, the proportion of the amono-carboxylic acid(s) or the lactam(s) thereof being at least 2.5 mol %, preferably at least 7.5 mol %, the proportion of the aliphatic diamine(s) or the proportion of the sum of aliphatic diamine(s) and aliphatic dicarboxylic acid(s) being at least 2.5 mol %, preferably at least 7.5 mol %, and the proportion of the sum of aminocarboxylic acid(s) or the lactam(s) thereof, aliphatic diamine(s) or/and aliphatic dicarboxylic acid(s) being at least 5 mol % and at the most 80 mol %, preferably at least 15 mol % and at the most 50 mol %, calculated on the total sum of bis-(aminomethyl)-cyclohexane(s), aromatic dicarboxylic acid(s), amino-carboxylic acid(s) or the lactam(s) thereof, and aliphatic diamine(s) or/and aliphatic dicarboxylic acid(s), are used.

When using aliphatic diamine(s) and aliphatic dicarboxylic acid(s) at the same time these are used preferably in the molar ratio of 1 : 1.

The diamines 1,3-bis-(aminomethyl)-cyclohexane and 1,4-bis-(aminomethyl)-cyclohexane hereafter also termed cycloaliphatic diamine(s) necessary for use according to the process of the invention can be obtained by hydrogenation of the corresponding xylylene diamines. For the preparation of the transparent polyamides trans-1,3-bis-(aminomethyl)-cyclohexane and mixtures of trans-1,3-bis-(aminomethyl)-cyclohexane and trans-1,4-bis-(aminomethyl)-cyclohexane are especially suitable. However, also the corresponding cis-diamines or mixtures of cis- and trans-diamines can be used.

Suitable aromatic dicarboxylic acids which can be used according to the invention are those having from 6 to 20 carbon atoms, preferably from 8 to 14 carbon atoms, or mixtures of these dicarboxylic acids. Especially suitable are mononuclear dicarboxylic acids carrying the carboxylic groups in the meta- or para-position, above all isophthalic acid and terephthalic acid.

Further advantageous examples of dicarboxylic acids suitable for use in accordance with the invention are 2,5-thiopheno-dicarboxylic acid, 2,6-pyridine-dicarboxylic acid, 4,4'-diphenyl-dicarboxylic acid, 1,4-naphthalene-dicarboxylic acid, 1,5-naphthalene-dicarboxylic acid, 2,6-naphthalene-dicarboxylic acid, 4,4'-diphenylsulfone-dicarboxylic acid, 4,4'-diphenyl ether dicarboxylic acid, 4,4'-diphenyl-methane dicarboxylic acid, 3,3'-diphenylmethane dicarboxylic acid, 1,1-bis[p-carboxy-phenyl]-ethane, 2,2-bis[p-carboxy-phenyl]-propane or 4,4'-dibenzyl-dicarboxylic acid.

Mixtures of two or more of the aromatic dicarboxylic acids can also be used, especially mixtures of isophthalic acid with terephthalic acid or isophthalic acid with 4,4'-diphenylsulphone-dicarboxylic acid.

Suitable aliphatic amino carboxylic acids which can be used according to the invention are those having from 2 to 20 carbon atoms, preferably from 6 to 12 carbon atoms, especially ω-amino-carboxylic acids, ε-amino-caproic acid is used especially advantageously. Further advantageous examples for aliphatic aminocarboxylic acids for the preparation of the polyamides according to the invention are aminopivalic acid, ω-amino-heptylic acid, ω-amino-caprylic acid, ω-amino-pelargonic acid, ω-amino-undecanoic acid and ω-aminolauric acid.

Mixtures of two or more of the aliphatic amino carboxylic acids may also be used.

Instead of the aminocarboxylic acids also the lactams thereof may be used. The use of mixtures of ε-caproic lactam and lauric lactam is especially advantageous. Mixtures of amino-carboxylic acids and lactams can also be used.

As straight chain or branched aliphatic diamines for the preparation of polyamides according to the process of the invention those are suitable which have from 2 to 20 carbon atoms, preferably from 6 to 12 carbon atoms.

Advantageous examples of aliphatic diamines suitable for the preparation of the transparent polyamides of the invention are tetramethylene diamine, pentamethylene diamine, 2-methylpentamethylene diamine, 2-methylhexamethylene diamine, 3-methylhexamethylene diamine, 3,4-dimethylhexamethylene diamine, 2,2,4-trimethylhexamethylene diamine, 2,4,4-trimethylhexamethylene diamine, heptamethylene diamine, 2-methyl-4-ethylheptamethylene diamine, octamethylene diamine, nonamethylene diamine, decamethylene diamine, undecamethylene diamine and dodecamethylene diamine, above all hexamethylene diamine.

Mixtures of two or more of the aliphatic diamines may also be used.

As straight chain or branched aliphatic dicarboxylic acids for the preparation of polyamides according to the process of the invention those having from 2 to 20 carbon atoms, preferably from 6 to 12 carbon atoms, above all adipic acid and decane-dicarboxylic acid-1,10 are suitable.

Further advantageous examples of aliphatic dicarboxylic acids suitable for the preparation of the transparent polyamides of the invention are 2,2,4-trimethyladipic acid, 2,4,4-trimethyladipic acid, pimelic acid, suberic acid, azelaic acid and sebacic acid.

Mixtures of two or more of the aliphatic dicarboxylic acids may also be used, above all mixtures of adipic acid and decane-dicarboxylic acid-1,10.

The polyamides may be prepared in accordance with the known processes. Cycloaliphatic and optionally aliphatic diamine(s), dicarboxylic acid(s) and aminocarboxylic acid(s) or the lactam(s) thereof are put in an autoclave made of stainless steel, optionally with the addition of water. It is often expedient to prepare first a salt from the starting components, which is then put in the steel autoclave, optionally with the addition of water. The contents of the autoclave are heated, while stirring, to a temperature of from about 200° to 260° C. Then, the steam is let off and the temperature is increased to 265° to 300° C. At this temperature condensation is continued in a nitrogen current, optionally in the vacuum, until the polyamide has attained the desired molecular weight.

It is often advantageous to use a surplus of up to 5% by weight, preferably from 0.5 to 2 % by weight, of cycloaliphatic and optionally of aliphatic diamine(s) as compared to the dicarboxylic acid(s) in order to compensate for distillation losses of diamine(s) during polycondensation.

Products with especially good strength values are obtained when first bis-(aminomethyl)-cyclohexane(s) and/or aliphatic diamine(s) are reacted with lactam(s) at increased temperatures, the molar ratio of cycloaliphatic and/or aliphatic diamine(s) to lactam(s) being at least 1 : 1, and subsequently the reaction products are polycondensed in a second step, optionally with the addition of further quantities of cycloaliphatic and/or aliphatic diamine(s), with the dicarboxylic acid(s) under the above conditions. The reaction of the diamine(s) with the lactam(s) is carried out at a temperature of from 100° to 350° C, preferably from 200° to 320° C.

Polyamides with high molecular weights and good mechanical properties are obtained when the polyamides prepared in the autoclave furnished with a stirrer are further condensed, preferably in a double-screw extruder under reduced pressure.

In the preparation of the polyamides instead of the dicarboxyic acids also their amide-forming derivatives such as dicarboxylic acid halides, esters, nitriles or amides can be used according to known processes.

The polyamides prepared according to the process of the invention should have a reduced specific viscosity (RSV) — measured on a solution of 1 g of the polyamide in 100 ml of a mixture of 60 parts by weight of phenol and 40 parts by weight of tetrachloroethane at a temperature of 25° C of from 0.6 to 3 dl/g, preferably from 1 to 2 dl/g.

In the preparation of the polyamides according to the process of the invention small quantities of monocarboxylic acids, for example, acetic acid, or of monoamines can be incorporated by condensation for the regulating of the molecular weight. Furthermore, also small quantities of trifunctional or more highly functional amines and/or carboxylic acids may be incorporated by condensation as chain branching agents.

The polyamides prepared according to the process of the invention are distinguished by a high degree of transparency, a good impact strength and good dielectric properties and lend themselves readily to being processed by injection and extrusion moulding. In general, they have second order transition temperatures of above 100° C and they are suitable for the manufacture of moulded articles that may also be used at higher temperatures. Some of the polyamides prepared according to the process of the invention, for example, some that contain 1,4-bis-(aminomethyl)-cyclohexane in combination with terephthalic acid, may crystallize when heated for a sufficient length of time at temperatures above the second order transition temperature and are then opaque, but can nevertheless be injection-moulded to form transparent articles, if injected into a sufficiently cooled mould.

Moulded articles prepared from the polyamides prepared according to the process of the present invention are transparent and possess good dielectrical properties. Because of the high second order transition temperatures of the polyamides the moulded articles can be used at relatively high temperatures without losing their good mechanical properties. They have a high ball indentation hardness together with a good impact strength.

The polyamides prepared according to the process of the present invention can be used in all cases where transparency and good mechanical properties at high temperatures are necessary. They can be processed into sheets, plates tubes and, especially advantageously, by injection moulding, into technical parts.

The polyamides prepared according to the process of the invention may contain additives such as light and heat stabilizers, antistatic agents, lubricants, mould release agents, optical brighteners and dyestuffs, these additives may be added before, during or after the polycondensation.

The following examples illustrate the invention.

EXAMPLES

The viscosity measurements were carried out with solutions of 1 gram of polyamide in 100 ml of phenol-tetrachloroethane (in a weight ratio of 60 : 40) at 25° C. The second order transition temperatures were determined by differential thermoanalysis at a heating speed of 4° C/min.

EXAMPLE 1

A mixture of 1,015 g of trans-1,3-bis-(aminomethyl)-cyclohexane, 435 g of trans-1,4-bis-(aminomethyl)-cyclohexane, 1,162 g of terephthalic acid, 438 g of adipic acid, 226 ε-caprolactam and 350 ml of water were introduced into a stainless steel autoclave rinsed with nitrogen.

The mixture was stirred for 2 hours at 240° C, and the pressure adjusted itself to 14 kg/cm².

Then, in the course of 1 hour the pressure was reduced to atmospheric pressure and at the same time the temperature was increased to 280° C. The mixture was stirred for 1 hour and 30 minutes in the nitrogen current, at this temperature. A transparent polyamide with a reduced specific viscosity of 1.43 dl/g was obtained. The second order transition temperature of the product was 156° C.

Plates, measuring 60 × 60 × 2 mm were produced on an injection moulding machine from the material. The cylinder temperaure was 280° C and the temperature of the mould was 60° C.

The impact strength of the plates was tested by a fall test. Each plate was placed on a rigid support having a circular bore (diameter: 2.6 cm) in such a way that the centre of the plate is above the bore. A falling body (weight : 940g) carrying a steel ball (diameter: 0.9 cm) at its lower end was dropped from various heights vertically and concentric to the bore onto the plate. As a measure of the impact strength there was determined the "mean falling height" in cm which denotes the height from which the falling body must fall onto the plates in order to cause 50 % of them to break. The tests were carried out after the injection-moulded plates had been stored for 5 days in air at 20° C. The mean falling height was 55 cm.

EXAMPLE 2

A polyamide was prepared from a mixture of 1,450 g of trans-1,3-bis-(aminomethyl)-cyclohexane, 1,330 g of terephthalic acid, 460 g of decane-dicarboxylic acid-1,10, 339 g of ε-caprolactam and 400 ml of water according to the process described in Example 1. The transparent polyamide obtained had a reduced specific viscosity of 1.48 dl/g. The second order transition temperature of the product was 142° C.

EXAMPLE 3

A polyamide was prepared from a mixture of 812 g of trans-1,3-bis-(aminomethyl)-cyclohexane, ,348 g of trans-1,4-bis-(aminomethyl)-cyclohexane, 1,162 g of isophthalic acid, 498 g of terephthalic acid, 236 g of hexamethylene diamine, 282 g of ε-caprolactam and 350 ml of water according to the process described in Example 1. The transparent polyamide obtained had a reduced specific viscosity of 1.32 dl/g. The second order transition temperature of the product was 161° C.

EXAMPLE 4

A polyamide was prepared from a mixture of 860 g of trans-1,3-bis-(aminomethyl)cyclohexane, 1,160 g of isophthalic acid, 920 g of 4,4'-diphenylsulfone-dicarboxylic acid, 480 g of 2-methyl-pentamethylene diamine, 450 g of ε-caprolactam and 300 ml of water according to the process described in Example 1. The transparent polyamide obtained had a reduced specific viscosity of 1.21 dl/g. The second order transition temperature of the product was 150° C.

EXAMPLE 5

A mixture of 1,015 g of trans-1,3-bis-(aminomethyl)-cyclohexane, 435 g of trans-1,4-bis-(aminomethyl)-cyclohexane and 113 g of ε-caprolactam were introduced into an autoclave rinsed with nitrogen. The mixture was heated to 270° C for 2 hours while stirring in the closed autoclave. After cooling 1,661 g of terephthalic acid and 393 g of hexamethylene diamine adipate were added. The air was displaced by nitrogen, and then the mixture was heated in the closed autoclave for 2 hours to 250° C while stirring. Then, the pressure was reduced to atmospheric pressure in the course of 1 hour and at the same time the temperature was increased to 280° C. At this temperature the mixture was stirred in the nitrogen stream for 1 hour and 15 minutes. A transparent polyamide was obtained with a reduced specific viscosity of 1.37 dl/g.

The second order transition temperature of the product was 174° C.

The material was processed into plates on an injection moulding machine as described in Example 1 and tested. The mean falling height was 105 cm.

EXAMPLE 6

A polyamide was prepared from a mixture of 1440 g of trans-1,3-bis-(aminomethyl)-cyclohexane, 1,245 g of isophthalic acid, 765 g of 4,4'-diphenyl sulfonedicarboxylic acid, 655 g of hexamethylene diamine adipate, 285 g of ε-caprolactam and 500 ml of water according to the process described in Example 1. The transparent polyamide obtained had a reduced specific viscosity of 1.17 dl/g. The second order transition temperature of the product was 149° C.

EXAMPLE 7

A polyamide was prepared from a mixture of 714 g of trans-1,3-bis-(amino-methyl)-cyclohexane, 306 g of trans-1,4-bis-(aminomethyl)-cyclohexane, 660 g of terephthalic acid, 1,001 g if isophthalic acid, 2,070 g of a mixture of equal parts of 2,2,4-and 2,4,4-trimethylhexamethylene-diamine, 1,800 g of azelaic acid, 680 g of ε-caprolactam and 800 ml of water according to the process described in Example 1. The transparent polyamide obtained had a reduced specific viscosity of 1.36 dl/g. The second order transition temperature of the product was 97° C.

What is claimed is:

1. A transparent polyamide consisting essentially of the polymeric condensation product of
   a. a mixture of 50 to 100 mol % of 1,3-bis-(aminomethyl)-cyclohexane and 50 to 0 mol % of 1,4-bis-(aminomethyl)-cyclohexane, based on the total amount of the bis-(aminomethyl)-cyclohexane components,
   b. at least one aromatic carbocyclic dicarboxylic acid containing from 6 to 20 carbon atoms
   c. at least one aliphatic amino-carboxylic acid having from 2 to 20 carbon atoms or a lactam thereof, and
   d. a fourth component selected from the group consisting of (i) straight chain or branched chain aliphatic diamines containing 2 to 20 carbon atoms, (ii) saturated straight chain or branched chain aliphatic dicarboxylic acids containing from 2 to 20 carbon atoms and mixtures of (i) and (ii), the amount of aminocarboxylic acid or lactam thereof at least 2.5 mol %, the amount of said fourth component being at least 2.5 mol % and the total amount of amino-carboxylic acid or lactam thereof and said fourth component being from 5 mol % to 80 mol % based on the total amount of components (a) through (d), said polyamide having a reduced specific viscocity of 0.6 to 3 dl/g as measured at a concentration of 1 gram of polyamide in 100 ml of a 60:40 weight mixture of phenol/tetrachloroethane at 25° C.

2. A transparent polyamide according to claim 1 wherein component (a) is a mixture of 65 to 100 mol % of 1,3-bis-(aminomethyl)-cyclohexane and 35 to 0 mol % of 1,4-bis-(aminomethyl)-cyclohexane.

3. A transparent polyamide according to claim 1 wherein component (b) is a dicarboxylic acid of 8 to 14 carbon atoms.

4. A transparent polyamide according to claim 1 wherein component (b) is a mono-nuclear dicarboxylic acid having carboxylic groups in the meta or para position.

5. A transparent polyamide according to claim 1 wherein component (b) is terephthalic acid or isophthalic acid or a mixture thereof.

6. A transparent polyamide according to claim 1 wherein component (b) is 4,4'-diphenylsulfone-dicarboxylic acid or a mixture thereof with isophthalic acid.

7. A transparent polyamide according to claim 1 wherein component (c) is an amino-carboxylic acid of 6 to 12 carbon atoms or lactam thereof.

8. A transparent polyamide according to claim 1 wherein componeent (c) is an ω-amino-carboxylic acid or lactam thereof.

9. A transparent polyamide according to claim 1 wherein component (c) is at least one of ε-amino-caproic acid, ε-amino-lauric acid or a lactam thereof.

10. A transparent polyamide according to claim 1 wherein component (d) is a diamine containing 6 to 12 carbon atoms.

11. A transparent polyamide according to claim 1 wherein component (d) is hexamethylene diamine.

12. A transparent polyamide according to claim 1 wherein component (d) is a dicarboxylic acid containing 6 to 12 carbon atoms.

13. A transparent polyamide according to claim 1 wherein component (d) is at least one of adipic acid or decane-dicarboxylic acid -1,10.

14. A transparent polyamide according to claim 1 wherein component (c) is used in an amount of at least 7.5 mol %.

15. A transparent polyamide according to claim 1 wherein the sum of components (d) is at least 7.5 mol %.

16. A transparent polyamide according to claim 1 wherein the sum of components (c), and (d) is from 15 mol % to 50 mol %.

17. A transparent polyamide according to claim 1 having a reduced specific viscosity of 1 to 2 dl/g.

* * * * *